Nov. 17, 1964 — A. F. BUJAN — 3,157,481
AIR FILTER ASSEMBLY
Filed Dec. 11, 1961 — 2 Sheets-Sheet 1
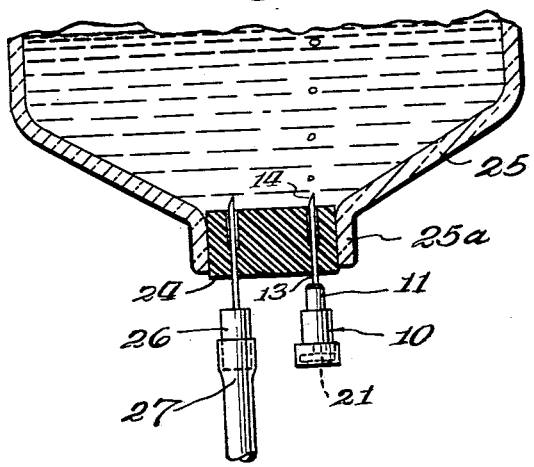
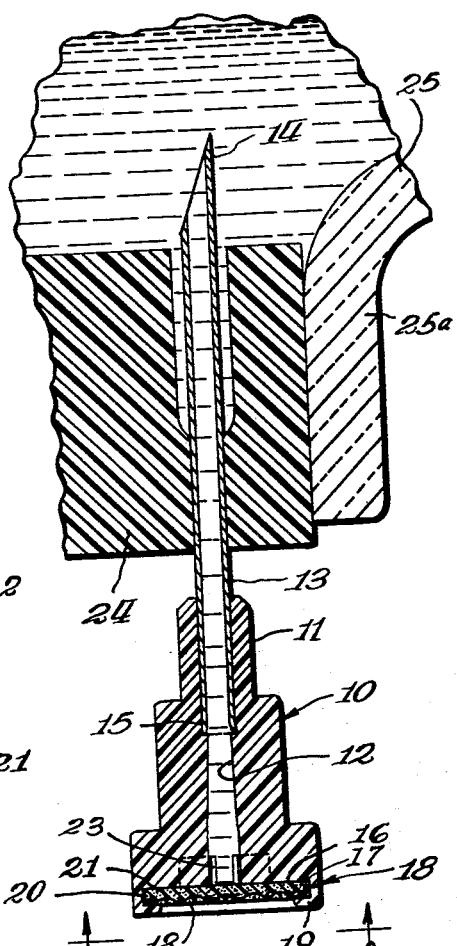
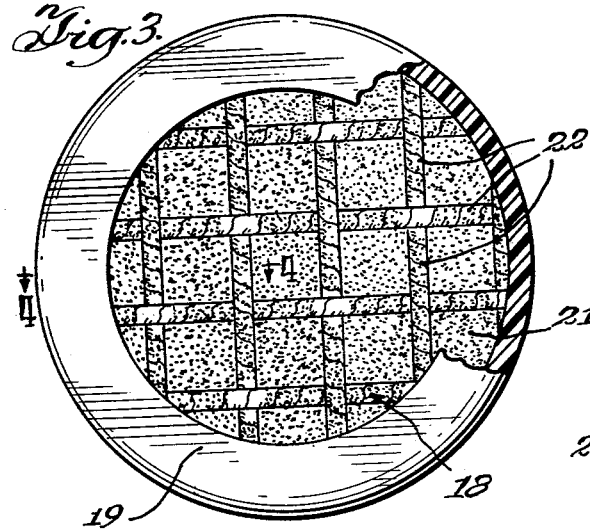
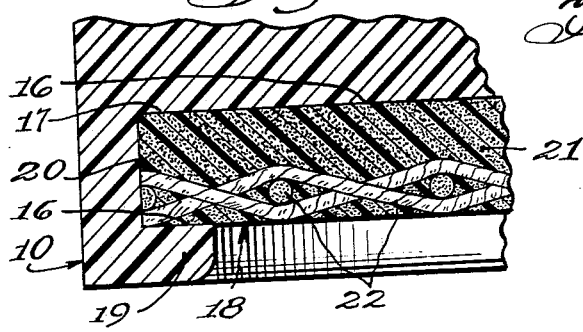
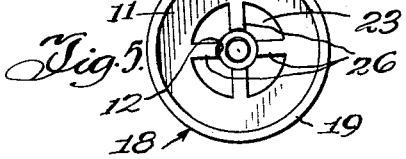
Inventor
Albert F. Bujan
By Joseph J. Grass
Attorney

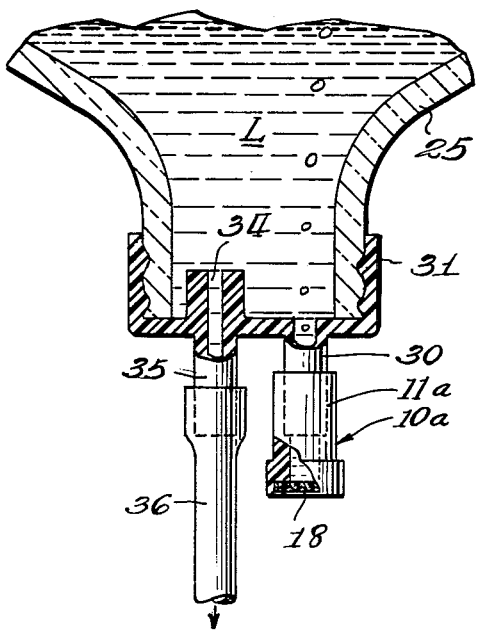
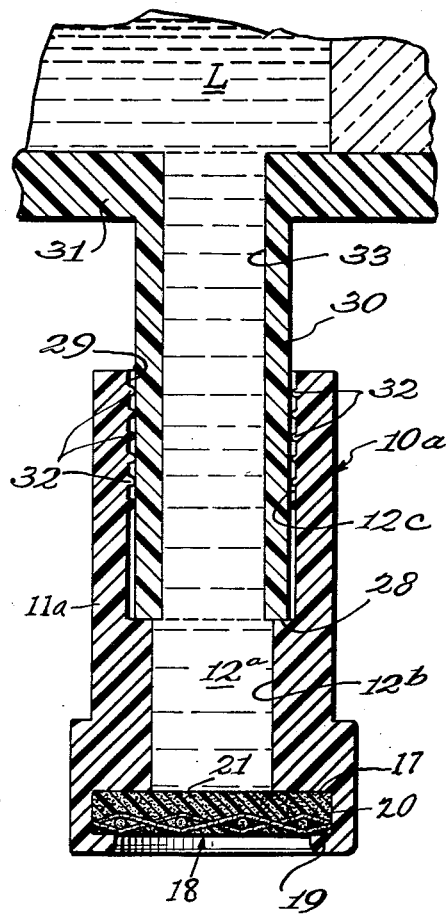
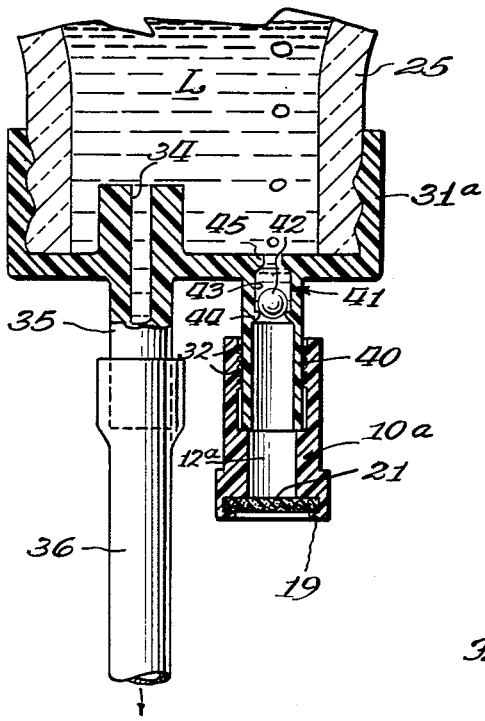

United States Patent Office 3,157,481
Patented Nov. 17, 1964

3,157,481
AIR FILTER ASSEMBLY
Albert F. Bujan, Waukegan, Ill., assignor to Abbott Laboratories, Chicago, Ill., a corporation of Illinois
Filed Dec. 11, 1961, Ser. No. 158,372
2 Claims. (Cl. 55—417)

This invention relates to an air filter assembly for filtering air of foreign contaminating bodies such as bacteria, dust and the like. The air filter assembly of the invention is particularly adapted for use with a solution or blood container in which some type of air vent is necessary or desirable.

The air filter assembly of the invention employs an air filter which is illustrated herein as taking the form of an air filter disk. The air filter is impervious to liquids for example solutions and blood and also to dust, bacteria and the like, but it is pervious to air. It is, therefore, apparent that by employing the air filter assembly of the invention, the air which passes therethrough into the liquid container is certain to be free from dust, bacteria, and the like.

It is one of the purposes of the invention to provide a filter assembly which is simple and economical to manufacture, and which is sterilizable.

It is also one of the purposes of the invention to provide an air filter which possesses sufficient strength and which is mounted in the tubular body of the air filter assembly so that the air filter is able to withstand the liquid and air pressures of the order of magnitude normally experienced in usage, and yet the air filter does not shift with respect to the tubular body. In addition, the air filter assembly of the invention is such that the air filter is sealingly retained in the tubular body. Accordingly, neither liquids nor gases can pass or seep around the air filter.

In one of the specific embodiments of the invention, there is provided an air filter assembly having a tubular body, a bottle stopper piercing cannula mounted therein, and an air filter taking the form of an air filter disk having the above-described characteristics. The air filter disk is sealingly mounted in the tubular body and traverses a passage in said tubular body.

In another specific embodiment of the invention, there is illustrated an air filter assembly having a tubular body one end of which is adapted to engage a fitment of a solution container for example. An air filter, the same as the one employed in the other embodiment of the invention, is sealingly retained at the other end of the tubular body.

In the diagrammatic drawings:

FIGURE 1 is a side elevation view, mainly in cross-section, of one embodiment of the air filter assembly of the invention the cannula of which is inserted through a bottle stopper fitted into a tubular neck of a liquid container;

FIGURE 2 is an enlarged cross-sectional view of the filter assembly of the one embodiment of the invention and a fragmentary portion of a bottle stopper and a liquid container;

FIGURE 3 is an enlarged end view partly in cross-section taken along line 3—3 of FIGURE 2;

FIGURE 4 is a cross-sectional view taken along line 4—4 of FIGURE 3;

FIGURE 5 is an end view of the air filter assembly before the air filter disk has been placed in the tubular body and before the terminal end of the tubular body has been crimped;

FIGURE 6 is an elevation view, mainly in cross-section, showing another embodiment of the air filter assembly of the invention used in conjunction with one type of adapter fitment;

FIGURE 7 is an elevation view, mainly in cross-section, showing the other form of the air filter assembly of the invention employed with another type of adapter fitment; and FIGURE 8 is an enlarged cross-sectional view of the other embodiment of the air filter assembly of the invention received by a fitment of the adapter fitment.

Referring now to FIGURES 1 and 2 of the illustrative drawings, there is shown an air filter assembly generally indicated at 10. The air filter assembly 10 includes a tubular body 11 having a passage 12 therein in which there is mounted a bottle stopper piercing cannula 13 having a piercing point 14 and a flared portion 15 which keys the cannula 13 to the tubular body 11. The tubular body 11 is provided with a shoulder 16 which abuts against one side of an air filter disk 18 at a marginal edge 17. A terminal end of the tubular body 11 is provided with a flange 19 which is crimped to embrace a peripheral edge 20 and the other side of the filter disk 18 at the marginal edge 17. The tubular body 11 is preferably composed of a thermoplastic material which enables the flange 19 to be heat crimped to the position indicated in FIGURE 2 of the illustrative drawings. When the tubular body is composed of a thermoplastic material, the flange 19 is heat crimped to flow into sealing abutment with the filter disk 18 in order that no foreign contaminating particles such as bacteria or the like can pass from the outside of the air filter assembly 10 around the peripheral edge 20 and into the passage 12. The tubular body can be composed of a formable metal, such as thin stainless steel or aluminum, if desired.

The filter disk 18 is preferably composed of a type of filter material 21 such as copolymer of tetrafluoroethylene and hexafluoropropylene, commercially known as Teflon. The filter material 21 is preferably reinforced by laminating it to a coarse mesh fibrous glass fabric 22. When laminated, the material 21 becomes impregnated in the fibrous glass fabric 22. By way of specific example only but in no limiting sense, the filter disk 18 is about 0.005 of an inch thick.

As best shown in FIGURE 5 of the illustrative drawings, the tubular body 11 is provided with a recess 23 which is in effect an enlarged portion of the passage 12. The recess 23 provides a greater area through which the filtered air passes into the major portion of the passage 12. When the cannula 13 is forced through a penetrable bottle stopper 24 which is received in a tubular neck 25a of a liquid container 25. It is normal for a force in the form of finger pressure to be applied against the air filter disk 18 by the user thereof. To prevent the air filter disk 18 from being flexed and possibly consequently forced into the recess 23 by the finger pressure of the user, one or more supporting members 26 are employed to provide support for the filter disk 18 to resist flexure.

As is shown in FIGURE 1 of the illustrative drawings, the cannula 13 of the filter assembly 10 is inserted through the bottle stopper 24 and the air is free to pass into the liquid container 25 when the liquid L contained therein passes through administration tubing 27. The air which enters the liquid container 25 displaces the liquid L which passes through what is shown to be a needle assembly 26 into the administration tubing 27.

As concerns the embodiment of FIGURES 6 through 8 of the illustrative drawings, like reference characters are employed to designate components having the same construction, function, and relative location as in the embodiment of FIGURES 1 through 5.

Referring now to the embodiment of FIGURES 6 through 8 of the illustrative drawings, an air filter assembly 10a of the invention is shown to comprise a tubular body 11a having a passage 12a therein. The passage 12a includes a main bore 12b and auxiliary bore 12c. Since the auxiliary bore 12c is shown to be larger than the main bore 12b, a shoulder 28 is provided which forms an abutment for a fitment 30 of an adapter fitment 31. The auxiliary bore 12c is provided with an opening 29 at one end. The auxiliary bore 12c is shown to be provided with a plurality of retaining rings 32 which grip the fitment 30 and prevent stray foreign contaminating particles such as bacteria from entering into a passage 33 of the fitment 30 from along the auxiliary bore 12c. Although the auxiliary bore 12c can be tapered to be snugly received by the fitment 30, if desired, the provision of annular rings 32 is preferred.

In reference to FIGURE 6 of the illustrative drawings, the liquid L which leaves the liquid container 25 passes through a passage 34 in a fitment 35 and then into administration tubing 36. It is to be noted that no liquid check valve is required in either the fitment 30 or in the air filter assembly 10a since the filter disk 18 is impervious to liquids.

There is shown in FIGURE 7 an adapter fitment 31a having a fitment 40. A check valve 41 is shown to take the form of a ball 42 which is capable of longitudinal movement in a bore 43; the check valve 41 also includes a seat which is shown to take the form of an annular ring 44. The check valve 41 prevents the liquid L contained in the liquid container from passing through the bore 43. A plurality of inwardly extending projections 45 prevent the ball 42 from falling out of the bore 43 when the adapter fitment is inverted from the position shown in FIGURE 7.

The check valve 41 is employable in the event it is desired to provide secondary administration equipment which for example comprises a secondary liquid container having an air filter assembly and tubing, not shown herein. In this event, the air filter assembly 10a is not employed and the tubing is received by the fitment 40. The check valve 41, it is apparent, prevents the liquid L in the container 25 from passing into the tubing, not shown. The air filter assembly 10a, however, is effective either with or without a check valve because the filter disk 18 is itself in actuality a liquid check valve.

In the ordinary usage of the filter assembly of the embodiment of FIGURES 1 through 5 of the illustrative drawings, the liquid container 25 is composed of for example glass or a rigid or semi-rigid plastic. However, it is to be understood that the air filter assemblies 10 and 10a of the invention are each employable with any type of liquid container which requires an air vent.

The above-described embodiments being exemplary only, it will be understood that modifications in form or detail can be made without departing from the spirit and scope of the invention. Accordingly, the invention is not to be considered as limited save as is constant with the scope of the following claims.

What is claimed is:

1. An air filter assembly comprising a hollow, open-ended fitment adapted to communicate with a parenteral fluid, a hollow plastic body defining a main bore and an auxiliary bore of greater diameter than said main bore and interconnected by a shoulder to said main bore, a plurality of vertically spaced sealing rings mounted in said auxiliary bore and sealingly engaging the outer surface of said fitment, the proximal end of said fitment being sealingly seated against said shoulder, a second shoulder near the proximal end of said hollow member, an air filter disc comprising structurally reinforced copolymer of tetrafluoroethylene and hexafluoropropylene in sealing abutting relating on one side at its marginal edge with said second shoulder, and an integral crimped flange on the proximal end of said plastic body sealingly and supportingly embracing the other side of said marginal edge.

2. Apparatus as set forth in claim 1 including a valve seat located in the hollow portion of said fitment and a ball valve adapted to seat in said valve seat to sealingly obstruct flow through said hollow fitment.

References Cited in the file of this patent
UNITED STATES PATENTS

| | | |
|---|---|---|
| 2,804,936 | Stampe | Sept. 3, 1957 |
| 2,933,154 | Lauterbach | Apr. 19, 1960 |
| 3,010,536 | Plurrin et al. | Nov. 28, 1961 |
| 3,048,173 | Kompelien et al. | Aug. 7, 1962 |

UNITED STATES PATENT OFFICE
CERTIFICATE OF CORRECTION

Patent No. 3,157,481            November 17, 1964

Albert F. Bujan

It is hereby certified that error appears in the above numbered patent requiring correction and that the said Letters Patent should read as corrected below.

Column 2, line 48, for "25. It" read -- 25, it --; column 4, line 27, for "relating" read -- relation --.

Signed and sealed this 27th day of April 1965.

(SEAL)
Attest:

ERNEST W. SWIDER            EDWARD J. BRENNER
Attesting Officer            Commissioner of Patents